March 18, 1941. W. J. TODHUNTER 2,234,991
ASSEMBLING AND PILING UNIT, ESPECIALLY PLATES
Filed Aug. 9, 1939
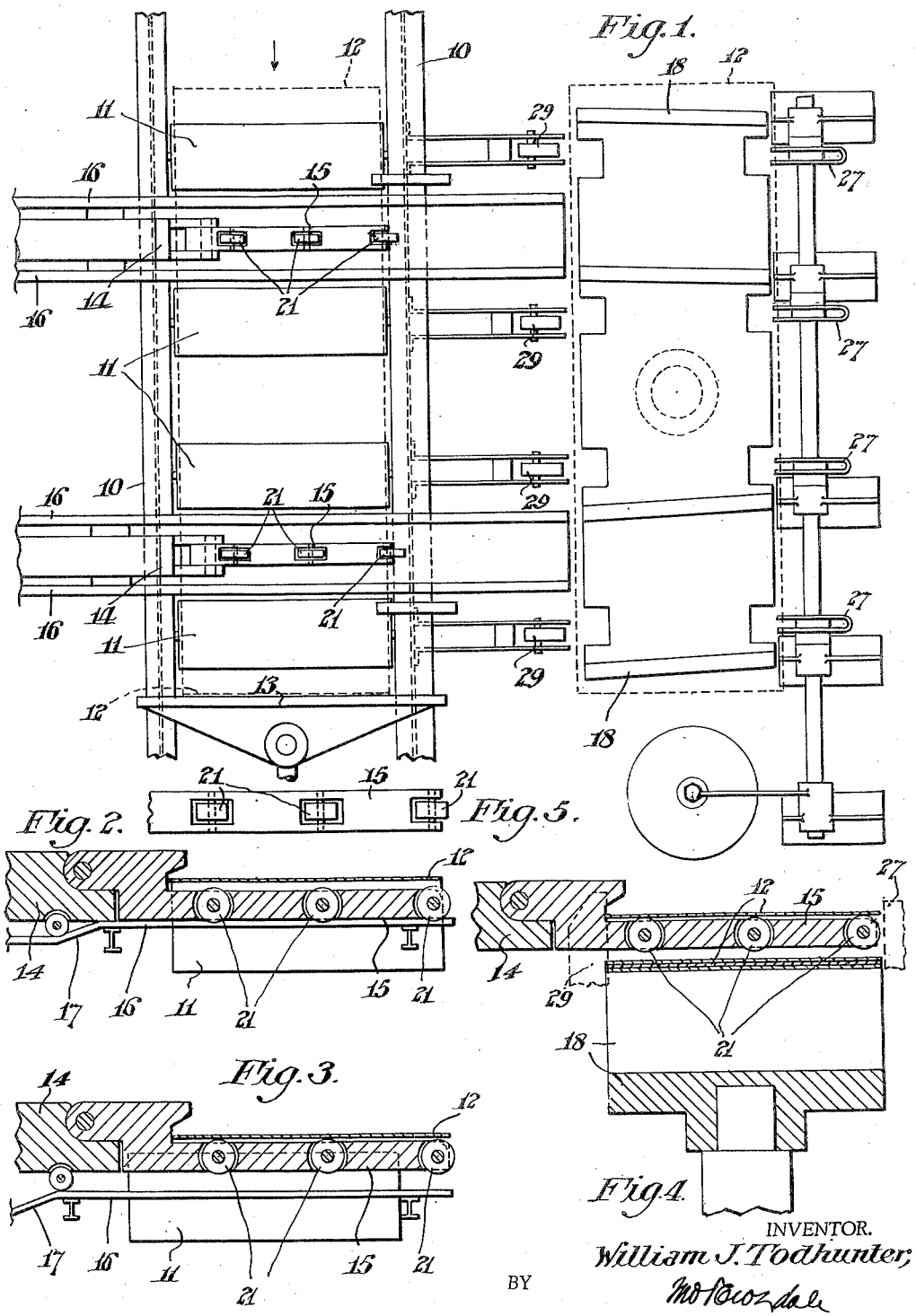
INVENTOR.
William J. Todhunter,
BY
ATTORNEY.

Patented Mar. 18, 1941

2,234,991

UNITED STATES PATENT OFFICE 2,234,991

ASSEMBLING AND PILING UNIT, ESPECIALLY PLATES

William J. Tedhunter, Newcastle, New South Wales, Australia

Application August 9, 1939, Serial No. 289,117

2 Claims. (Cl. 198—24)

The invention relates to means for piling steel plates or the like.

The object is to provide improved means for assembling and piling the plates in orderly manner so that the same may be handled for transportation or the like, and so that the surfaces of the plates shall not be scratched or otherwise injured.

The invention comprises modifications and improvements in the device shown and described in my pending application Serial No. 279,421 filed June 16, 1939.

The especial feature of the present invention comprises the means adapted for handling plates so that the surfaces or faces of the plates will not be scratched or otherwise marred.

For this purpose a number of rollers are secured to the tongue-extensions having their peripheries projecting above the longitudinally extending top surface of the tongue-extensions so that the relative movements of said tongue-extensions and plates are facilitated and the scratching or marring of the surface or face of the plate is prevented.

Means are also preferably provided whereby, when the reciprocating bars and tongue-extensions start to move forward to carry the plate to position over the loading table, the tongue-extensions are elevated to lift the plate above the table rollers and thus prevent frictional movement between plate and rollers which would result in marring the surface of the plate.

Referring to the drawing which illustrates merely by way of example a suitable embodiment of the invention—

Fig. 1 is a plan view, more or less diagrammatic, showing the general arrangement of the parts.

Fig. 2 is a fragmentary side elevation in part section of the same.

Fig. 3 is a similar view showing the parts in different positions.

Fig. 4 is a similar view of the parts in still different positions, showing the tongue-extension in position to deliver the plate to the loading table.

Fig. 5 is a fragmentary plan of a tongue-extension.

Similar numerals refer to similar parts throughout the several views.

In Fig. 1 the roller table is shown consisting of the frame 10 and table rollers 11. The plate 12 moves in the direction of the arrow until it engages the adjustable stop 13, when it is in position to be acted upon by the reciprocating bars 14, provided with the horizontal tongue-extensions 15, approximately equal in length to that of the table rollers 11.

These reciprocating bars 14 are mounted on suitable tracks or supporting ways 16, and are preferably actuated by suitable power cylinders not shown.

Fig. 2 shows, in fragmentary elevation, the same arrangement as shown in Fig. 1, with the tongue-extension 15 projecting between the adjacent table rollers 11, with the top surfaces of the tongues slightly below the top peripheral surface of the table rollers 11.

In Fig. 3 the reciprocating bars 14 are shown sufficiently advanced to raise the tongue-extensions 15 so as to lift the plate off the tops of the table rollers, before the actual forward movement of the plate begins.

This elevating movement of the tongue-extensions is secured by providing a higher level of the track 16 which extends between the table rollers, and which higher level is connected to the lower level of the track extension by an upwardly sloped extension 17.

The continued forward movement of the reciprocating bar 14 carries the tongue-extensions and the plate toward and to the position over the loading table 18 with the plate engaging suitable stops 27 as shown in Figs. 1 and 4.

At the end of this forward movement of the tongue-extensions 15, suitable stops 29 are actuated to project above the plane of the plate at the rear edge thereof, to prevent any backward movement of the plate when the tongue-extensions 15 are withdrawn from under the plate to deliver the same to the pile of plates on the loading table 18. These stops 27 and 29 are adapted to be actuated to cooperate in securing the desired positioning of each plate as it is delivered to the pile. Such means are clearly shown and described in my said pending application and need not therefore be described in further detail in the present application.

When the tongue-extensions 15 have reached the final point in their advanced movement, and the stops 27 and 29 have come into action to secure the proper positioning of the plate, the tongue-extensions are withdrawn from under the plate, while still under control of the stops, so that the plate will be laid squarely upon the pile.

In connection with the last noted operation it will be observed that, as a preferred means, the tongue-extensions 15 are each provided with a series of anti-friction freely rotating wheels or rollers 21, extending from end to end of each tongue extension, the outermost of said wheels or rollers being at the extreme outer end of the tongue-extension, so that, as each tongue-extension is being withdrawn from under the plate, only the anti-friction wheels or rollers 21 engage the surface or underface of the plate and thus prevent any scratching of said surface or face by the friction between the tongue-extension and the plate when the former is withdrawn from under the latter.

What I claim is:

1. In a device of the character described, the combination of a loading table, means for bringing plates into position for transfer to said table, a reciprocating bar, a track having vertically spaced offset portions in parallel planes, interconnected with an inclined portion, for supporting the said bar in its reciprocating movements and a tongue secured to the forward end of the bar, said tongue having associated therewith means forming a pusher area, and provided with a plate supporting surface adapted to yield upon engagement with the plate.

2. In a device of the character described, the combination of a loading table, means for bringing plates into position for transfer to said table, a reciprocating bar, a track having vertically spaced offset portions in parallel planes, interconnected with an inclined portion, for supporting the said bar in its reciprocating movements and a tongue secured to the forward end of the bar, said tongue having associated therewith means forming a pusher area, and provided with freely rotating anti-friction plate supporting rollers.

WILLIAM J. TODHUNTER.